United States Patent

[11] 3,586,939

| [72] | Inventors | Francis P. Buiting<br>Plainville;<br>Lyle E. McBride, Jr., Norton, both of, Mass. |
|---|---|---|
| [21] | Appl. No. | 735,377 |
| [22] | Filed | June 7, 1968 |
| [45] | Patented | June 22, 1971 |
| [73] | Assignee | Texas Instruments Incorporated<br>Dallas, Tex. |

[54] ELECTROTHERMAL MOTOR STARTING APPARATUS
9 Claims, 4 Drawing Figs.

[52] U.S. Cl. .................................................. 318/221 E,
 318/221 H, 337/107
[51] Int. Cl. .................................................. H02p 1/44
[50] Field of Search .......................................... 337/107;
 318/220, 221, 221.9

[56] References Cited
UNITED STATES PATENTS

| 3,495,150 | 2/1970 | Enemark ..................... | 318/221 |
| 2,132,888 | 10/1938 | Werner ...................... | 318/221 |
| 3,414,789 | 12/1968 | Prouty ...................... | 318/221 |
| 3,434,089 | 3/1969 | Waseleski, Jr. et al. ...... | 337/107 |

FOREIGN PATENTS

| 1,042,126 | 9/1966 | Great Britain ............... | 318/221 |
| 1,086,968 | 10/1967 | Great Britain ............... | 318/221 |

Primary Examiner—Oris L. Rader
Assistant Examiner—Gene Z. Rubinson
Attorneys—Harold Levine, Edward J. Connors, Jr., James P. McAndrews, John A. Haug and Gerald B. Epstein ABSTRACT: Apparatus is described for automatically deenergizing the start winding of an electric motor after a predetermined delay. The start winding is deenergized by a thermally responsive switching means to which heat is applied by a PTC thermistor operated in a self-heating mode. The PTC characteristic of the thermistor limits heating after the motor is started. The thermally responsive current switching means may include a snap-acting thermostatic switch or a semiconductor current switching device controlled by another thermistor.

3,586,939

ELECTROTHERMAL MOTOR STARTING APPARATUS

This invention relates to apparatus for automatically deenergizing the start winding of an electric motor after a predetermined delay following energization of the motor and more particularly to such apparatus employing a self-heating and self-regulating PTC thermistor which operates thermally responsive current switching means.

It has heretofore been known to employ thermal time delay relays for automatically deenergizing the start windings of electric motors. However, such constructions, generally utilizing conventional resistive heating means, have been susceptible to variations in supply voltage and ambient air temperature. In addition, these prior art devices often have been mechanically complex because of the need to include temperature or voltage compensation bimetal strips and the like and the need to reduce the level of energization of the heating means after starting to a level suitable for continuously maintaining the start winding in a deenergized condition.

Among the several objects of the present invention may be noted the provision of novel electrothermal motor starting apparatus which automatically deenergizes a start winding after a predetermined time delay following energization of the motor; the provision of such apparatus which maintains the start winding in deenergized condition of the motor starts successfully and continues to run; the provision of such apparatus which will reset to again energize the start winding in the event that the motor does not start; the provision of such apparatus which may include semiconductor switching means for deenergizing a motor start winding without mechanical switch contacts; the provision of such apparatus which is self-regulating and relatively insensitive to variations in supply voltage and ambient temperature; the provision of such apparatus which is relatively simple and inexpensively constructed; and the provision of such apparatus which is highly reliable in operation and not subject to failure after long term, repeated usage. Other objects will be in part apparent and in part pointed out hereinafter.

Briefly, electrothermal motor starting apparatus of this invention automatically deenergizes the start winding of an electric motor after a short predetermined delay after the motor is first energized. The apparatus includes, for this purpose, thermally responsive switching means including either a snap-acting thermostatic switch or a thermistor controlled semiconductor current switching device. The thermally responsive switching means is heated, upon energization of the motor, by a PTC thermistor of the type whose electrical resistance increases relatively abruptly with increasing temperature above a transition temperature. The thermistor is connected to be electrically energized when the motor is energized and to thereby self-heat. The thermistor heats the switching means until, after a predetermined delay, it reaches a threshold temperature at which it deenergizes the start winding. The thermistor remains energized to maintain the switching means in its operated state as long as the motor is energized with further self-heating of the thermistor being limited by the relatively abrupt increase of its resistance above the transition temperature. In another aspect of the invention, the thermistor is connected in a circuit across the start winding so that it is energized concurrently with the start winding but, after the start winding is deenergized, is maintained above threshold temperature by voltages induced in the start winding by operation of the motor.

The invention accordingly comprises the constructions hereinafter described, the scope of the invention being indicated in the following claims.

In the accompanying drawings in which several of the various possible embodiments of this invention are illustrated, FIG. 1 is a schematic circuit diagram of electrothermal motor starting apparatus of this invention employing a snap-acting thermostatic switching device;

Corresponding reference characters indicate corresponding parts throughout the several views of the drawings.

Figure 1:
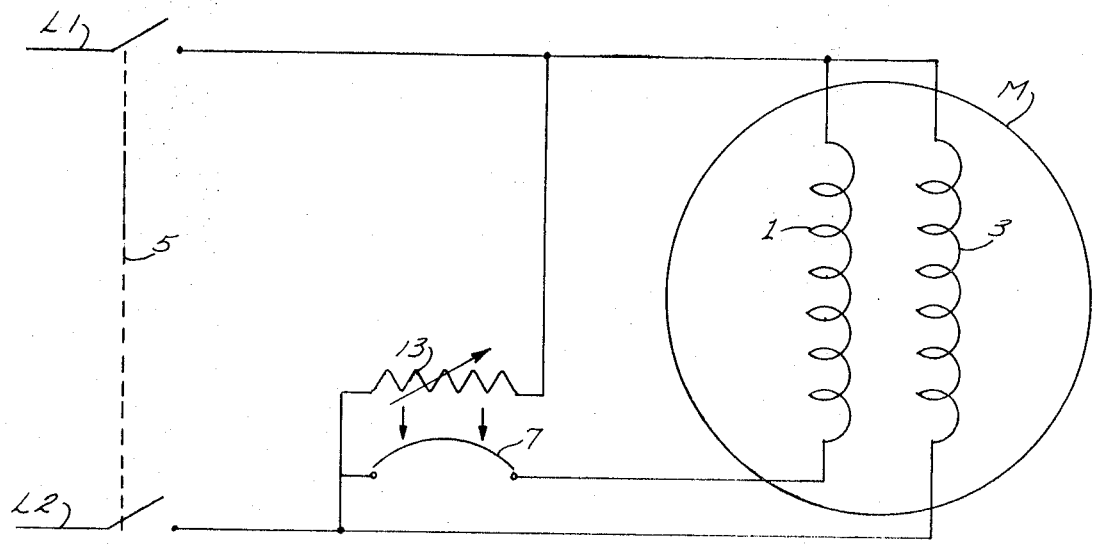

Referring now to FIG. 1, there is indicated generally at M an electric motor having a phase or start winding 1 and a run or main winding 3. Motor M is provided with electric power from a pair of supply leads L1 and L2 through a switch 5, the main winding 3 being directly connected across the switch terminals and the start winding being connected across these terminals through a snap-acting thermostatic switch 7 of the bimetallic disc type. Switch 7 is closed when relatively cool and opens when the temperature-sensitive element therein, i.e. the bimetallic disc, is heated above a predetermined level or threshold. Switch 7 constitutes switching means for controlling the flow of current to the start winding in a manner as described hereinafter. A conventional thermostatic motor protector may also be included in the motor circuit if desired.

Figure 2:
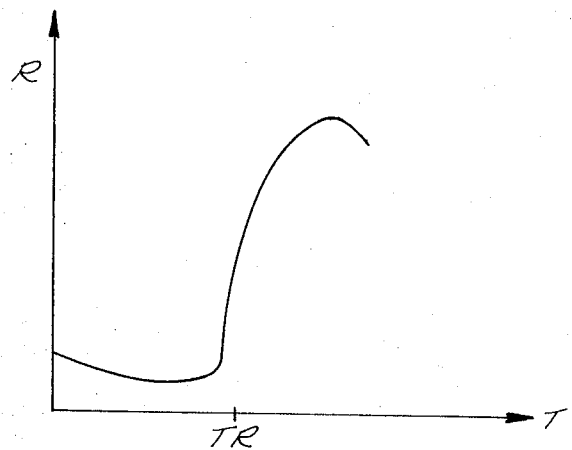
FIG. 2 is a graph representing the resistance of a PTC thermistor of the type employed in this invention as a function of its temperature.

A PTC thermistor 13 is connected in parallel across the main winding 3 and the series combination of the start winding 1 and the switch 7 and is thus supplied by the same voltage as the motor. The thermistor is of a type having a transition temperature above which its resistance increases relatively abruptly. This characteristic is shown in FIG. 2 in which the transition temperature is designated TR. When energized by the supply voltage, the thermistor 13 self-heats until its temperature reaches the transition temperature at which point the resistance of the thermistor rises abruptly to limit further current flow through the thermistor. The thermistor is thus maintained at an equilibrium temperature which is substantially equal to or determined by the transition temperature. Because the thermistor tends to seek and remain at this equilibrium temperature, the supply voltage or the ambient temperature may vary substantially without appreciably changing the thermistor's temperature. Accordingly, it can be seen that thermistor 13 is self-regulating with respect to temperature. The transition or equilibrium temperature of the thermistor 13 is above the operating threshold of the switch 7 and the thermistor is thermally coupled to the thermostatic switch 7, e.g., as by being placed in close proximity thereto, for applying heat to tee switch for causing it to operate to its open position.

In operation, when the supply voltage is initially connected to the motor by closing switch 5, thermistor 13 is in a cool, unheated state, and switch 7 is therefore in its closed position. Thus current flows through both the start winding 1 and the main winding 3. The thermistor 13 is energized concurrently with the motor and therefore self-heats and applies heat to the switch 7. Initially the current flowing through the thermistor is limited only by the relatively low resistance of the thermistor in its cool state and, accordingly, the thermistor heats relatively rapidly. After a predetermined delay for the bimetallic disc to reach its operating threshold temperature, the switch 7 opens, deenergizing the start winding. After thus causing the switch to operate, the thermistor continues to heat only until it stabilizes at its equilibrium temperature since further self-heating of the thermistor is limited by the increase of its resistance at the transition temperature TR as shown in FIG. 2. Thus no separate switching mechanism need be provided to reduce the energization of this heating element. As long as the motor is connected across the supply voltage, the thermistor will remain in its heated state in an equilibrium condition. When the motor is subsequently deenergized by opening switch 5, the thermistor will rapidly cool and the thermostatic switch 7 will return to a closed position. The apparatus is thus reset to allow the motor to be subsequently restarted.

Figure 3:
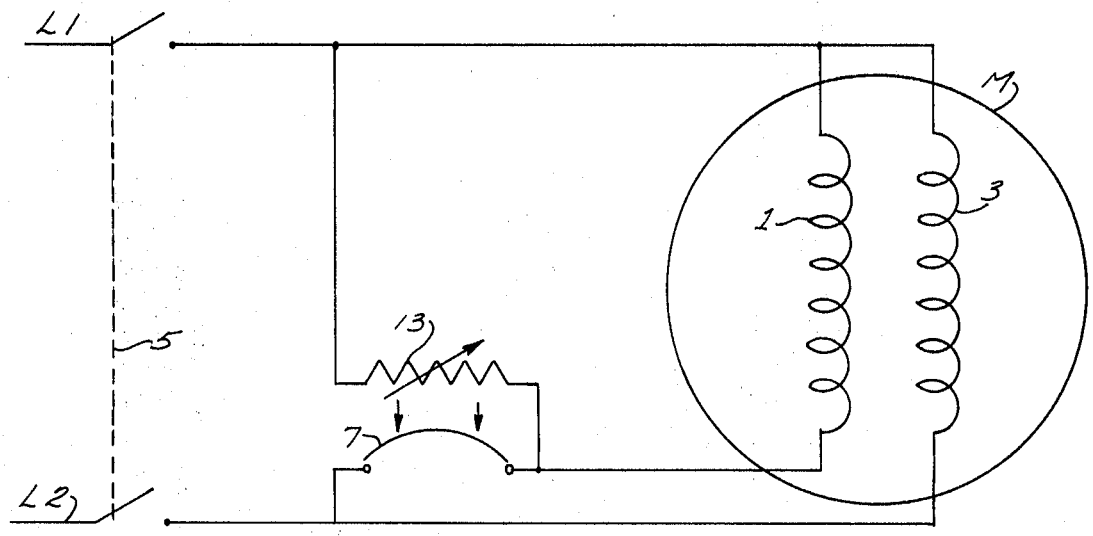
FIG. 3 is a schematic circuit diagram showing a modification of the thermistor motor starting apparatus of FIG. 1.

In the modification shown in FIG. 3, the PTC thermistor 13 is connected across the start winding 1 rather than directly across the source. The thermistor is thus energized from the source concurrently with the start winding when the motor is energized. As in the circuit of FIG. 1, the thermistor self-heats and operates the switch 7 to deenergize the start winding. Assuming that the motor starts and runs normally, an induced voltage is generated in the start winding even though the supply voltage is removed from the start winding. This induced voltage then maintains the energization of the thermistor, since the thermistor remains connected across the start winding. Even though the induced voltage will vary substantially with variations in motor speed and loading, the self-regulating character of the PTC thermistor 13 causes the thermistor to remain in its heated, equilibrium condition, i.e., at a temperature above the operating point of the switch 7. Further self-heating of the thermistor is limited by its increase in resistance at the transition temperature TR and thus the thermistor is self-protecting and self-regulating in spite of variations in the voltages induced in the start winding during running of the motor.

If the motor should fail to start upon initial energization, e.g., because of a locked rotor condition, or if the motor should subsequently become stalled after it has started but while still energized, then no voltages will be induced in the start winding. Accordingly, thermistor 13 will not be energized and cool down thereby permitting the switch 7 to return to its closed position, i.e., to automatically reset, again energizing the start winding for a new starting attempt. Thus automatic recycling may be provided for suitable applications.

Figure 4:
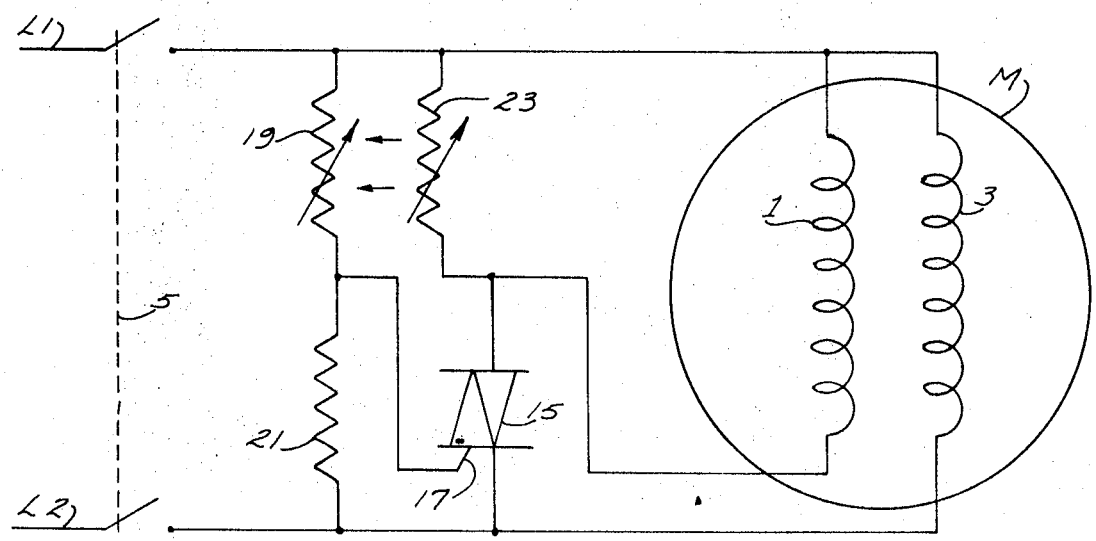
FIG. 4 is a schematic circuit diagram of another embodiment of this invention employing a triac for current switching.

Another embodiment of this invention, shown in FIG. 4, employs a semiconductor current switching device as switching means for controlling the flow of current to the start winding of an electric motor. A triac, or bidirectional triode thyristor, 15 is serially connected with the start winding 1 across lines L1 and L2 through switch 5. A triggering circuit consisting of a serially connected PTC thermistor 19 and a resistor 21 is provided for making the triac thermally responsive, the thermistor 19 providing a temperature sensitive element. The gate thermal of the triac is connected to a junction between the thermistor 19 and resistor 21. Connected across the start winding 1 is a PTC thermistor 23 which is of the same general type as shown in FIG. 1, i.e., it has a resistance-temperature characteristic generally as shown in FIG. 2. Thermistor 23 is thermally coupled to thermistor 19 for applying heat thereto.

In operation, when the supply voltage is initially applied to the motor by closing switch 5, thermistor 23 and thermistor 19 are in a cool, unheated state. Accordingly, the resistance of thermistor 19 is relatively low and less than that of the resistor 21 so that the triac 15 is triggered to a conductive state by the voltage appearing at the gate terminal 17 of the triac. Current is thus supplied to the start winding 1. Thermistor 23, being connected across the start winding, is energized concurrently therewith and rapidly self-heats in the manner previously explained with reference to the thermistor 13 of FIG. 1. Since thermistor 23 and thermistor 19 are thermally coupled, heat generated by thermistor 23 is applied to thermistor 19 thereby raising its temperature and increasing its resistance. When the resistance of thermistor 19 increases, the voltage appearing at the junction between thermistor 19 and resistor 21 and at the gate terminal 17 decreases. Accordingly, the triggering circuit consisting of thermistor 19 and resistor 21 is operative to deenergize the triac 15 when the temperature of thermistor 19 reaches a predetermined threshold at which its resistance is high enough to cause the voltage appearing at the gate terminal 17 of the triac to go below that value required to maintain the triac in a conductive state. In this way, after a predetermined delay for the thermistor 19 to reach the threshold temperature, the triac 15 is deenergized thereby deenergizing the start winding 1.

Being connected in a circuit across the start winding, thermistor 23 is maintained above the threshold temperature, after deenergization of the start winding, by voltages induced in the winding by operation of the motor in the same way as is the thermistor 13 in the circuit of FIG. 3 and further self-heating of the thermistor is limited by the increase of its resistance at its transition temperature. The circuit of FIG. 4 is thus operative to maintain the start winding in a deenergized state independently of variations in the induced voltages because of the self-regulating, self-protective character of thermistor 23.

If the motor should fail to start after having been energized or should become stalled while in operation, thermistor 23 will cool, permitting thermistor 19 to cool. With the resistance of thermistor 19 once more at a low value, triac 15 will again be rendered conductive, i.e., will be automatically reset to reenergize the start winding for a new starting attempt.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What we claim is:

1. Apparatus for automatically deenergizing the start winding of an electric motor after a predetermined delay following energization of said motor, said apparatus comprising: thermally responsive current switching means for controlling the flow of current to said start winding, said switching means including a temperature sensitive element which operates to deenergize said start winding when the temperature of said element exceeds a predetermined threshold; a PTC thermistor thermally coupled to said element for applying heat thereto for operating said switching means, said thermistor having a transition temperature above which the resistance of said thermistor rises relatively abruptly, said transition temperature being above said threshold temperature; and means for electrically energizing said thermistor concurrently with the energization of said motor thereby to self-heat said thermistor which, after a predetermined delay of said temperature sensitive element to reach said threshold temperature, operates said switching means to deenergize said start winding and then maintains said switching means in its operated state substantially independent from variations in supply voltage and ambient temperature, further self-heating of said thermistor being limited by the increase of the resistance of said thermistor at said transition temperature.

2. Apparatus as set forth in claim 1 wherein said switching means includes a snap-acting thermostatic switch.

3. Apparatus as set forth in claim 1 wherein said PTC thermistor is connected across said start winding.

4. Apparatus for automatically deenergizing the start winding of an electric motor after a predetermined delay following energization of said motor, said apparatus comprising: thermally responsive current switching means for controlling the flow of current to said start winding, said switching means including a temperature sensitive element which operates to deenergize said start winding when the temperature of said element exceeds a predetermined threshold; a PTC thermistor thermally coupled to said element for applying heat thereto for operating said switching means, said thermistor having a transition temperature above which the resistance of said thermistor rises relatively abruptly, said transition temperature being above said threshold temperature; and means for connecting said thermistor in a circuit across said start winding to energize said thermistor concurrently with the energization of said start winding thereby to self-heat said thermistor which, after a predetermined delay for said temperature sensitive element to reach said threshold temperature, operates said switching means and deenergizes said start winding, said thermistor being maintained above said threshold temperature after deenergization of said start winding by the voltage induced in said winding by operation of said motor with further self-heating of said thermistor being limited by the increase of the resistance of said thermistor at said transition temperature independently of variations in said induced voltages.

5. Apparatus for automatically deenergizing the start winding of an electric motor after a predetermined delay following energization of said motor, said apparatus comprising:
a semiconductor current switching device which, when energized, applies current to said start winding;
a triggering circuit, including a first thermistor, for controlling the energization of said semiconductor switching device, said triggering circuit being operative to energize said device except when the temperature of said first thermistor exceeds a predetermined threshold;
a second thermistor thermally coupled to said first thermistor for applying heat thereto; and
means for energizing said second thermistor concurrently with the energization of said motor thereby to self-heat said second thermistor which, after a predetermined delay for said first thermistor to reach said threshold temperature, causes said first thermistor to deenergize said switching device thereby deenergizing said start winding.

6. Apparatus as set forth in claim 5 wherein said semiconductor current switching device is a triac.

7. Apparatus as set forth in claim 5 wherein said triggering circuit includes a resistor connected in series with said first thermistor, and wherein said semiconductor switching device has a gate terminal which controls conduction through said device, said terminal being connected to a junction in said triggering circuit between said first thermistor and said resistor.

8. Apparatus as set forth in claim 5 wherein said means for energizing said second thermistor comprises circuit means for connecting said thermistor in a circuit across said start winding whereby said thermistor is energized concurrently with said start winding and is maintained above said threshold temperature after deenergization of said start winding by the voltage induced in said start winding by operation of said motor.

9. Apparatus for automatically deenergizing the start winding of an electric motor after a predetermined delay following energization of said motor, said apparatus comprising:
thermally responsive current switching means including a semiconductor current switching device for controlling the flow of current to said start winding, said switching means including a temperature sensitive element comprising a heat responsive thermistor for controlling conduction through said semiconductor device to deenergize said start winding when the temperature of said heat responsive thermistor exceeds a predetermined threshold;
a PTC thermistor thermally coupled to said heat responsive thermistor, said PTC thermistor having a transition temperature above which the resistance of said PTC thermistor rises relatively abruptly, said transition temperature being above said threshold temperature; and
means for electrically energizing said PTC thermistor concurrently with the energization of said motor thereby to self-heat said PTC thermistor which, after a predetermined delay of said heat responsive thermistor to reach said threshold temperature, operates said switching means to deenergize said start winding and then maintains said switching means in its operated state, further self-heating of said PTC thermistor being limited by the increase of the resistance of said PTC thermistor at said transition temperature.